US008128734B2

(12) United States Patent
Song

(10) Patent No.: US 8,128,734 B2
(45) Date of Patent: *Mar. 6, 2012

(54) TWO STAGE PRESSURE SWING ADSORPTION PROCESS FOR PRODUCING ENRICHED-OXYGEN

(75) Inventor: Yuwen Song, Chengdu (CN)

(73) Assignee: Chengdu Tianli Chemical Engineering Technology Co., Ltd., Chengdu, Sichuan (CN)

( * ) Notice: Subject to any disclaimer, the term of this patent is extended or adjusted under 35 U.S.C. 154(b) by 642 days.

This patent is subject to a terminal disclaimer.

(21) Appl. No.: 11/570,415

(22) PCT Filed: May 9, 2005

(86) PCT No.: PCT/CN2005/000640
§ 371 (c)(1),
(2), (4) Date: Oct. 17, 2008

(87) PCT Pub. No.: WO2005/120680
PCT Pub. Date: Dec. 22, 2005

(65) Prior Publication Data
US 2009/0151561 A1    Jun. 18, 2009

(30) Foreign Application Priority Data

Jun. 11, 2004 (CN) .......................... 2004 1 0046596

(51) Int. Cl.
*B01D 53/047* (2006.01)
*C01B 13/02* (2006.01)
(52) U.S. Cl. ................................. 95/96; 95/130; 95/139
(58) Field of Classification Search .................. 95/95, 96, 95/117, 130, 139, 148; 96/132
See application file for complete search history.

(56) References Cited

U.S. PATENT DOCUMENTS

| | | | | |
|---|---|---|---|---|
| 4,913,709 A * | 4/1990 | Kumar | ............................. | 95/100 |
| 5,234,472 A * | 8/1993 | Krishnamurthy et al. | ........ | 95/98 |
| 5,507,857 A * | 4/1996 | Kumar et al. | .................... | 95/101 |
| 5,547,492 A * | 8/1996 | Cho et al. | ......................... | 95/100 |
| 5,914,455 A * | 6/1999 | Jain et al. | ........................... | 95/96 |
| 5,993,517 A * | 11/1999 | Chen et al. | ........................ | 95/98 |
| 6,102,985 A * | 8/2000 | Naheiri et al. | ................... | 95/101 |
| 6,475,265 B1 * | 11/2002 | Baksh et al. | ...................... | 95/96 |
| 7,645,325 B2 * | 1/2010 | Song | ................................. | 95/96 |
| 2007/0221060 A1 * | 9/2007 | Song | ............................... | 95/100 |

* cited by examiner

*Primary Examiner* — Frank Lawrence, Jr.
(74) *Attorney, Agent, or Firm* — Cozen O'Connor

(57) ABSTRACT

An improved two stage pressure swing adsorption process for producing enriched oxygen and separating nitrogen or oxygen from a feed air stream. The process utilizes two-stage pressure swing adsorption plants which are serially connected. In the first stage, carbon dioxide, water and part of nitrogen are removed and nitrogen is concentrated. In the second stage nitrogen is further separated from the effluent intermediate gas from the adsorption step in the adsorption towers of the first stage and oxygen is concentrated to the desired concentration. In the first stage the adsorption towers go through the steps in turn in a cycle: Adsorption, Purge, evacuation, countercurrent pressure equalization rising of the second stage gas, purge gas pressurization, and final pressurization. In the second stage the adsorption towers go through the steps in turn in a cycle: Adsorption, countercurrent pressure equalization falling, and final pressurization.

52 Claims, 2 Drawing Sheets

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|----|----|----|----|----|----|----|----|----|----|----|----|----|----|----|
| A | A ||||||| P' ||| VC |||||| 2ER ||| R' ||| FR |||
| B | R' ||| FR ||| A |||||| P' ||| VC |||||| 2ER |||
| C | VC ||| 2ER ||| R' ||| FR ||| A |||||| P' ||| VC |||
| D | P' ||| VC |||||| 2ER ||| R' ||| FR ||| A ||||||

FIGURE 1

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|----|----|----|----|----|----|----|----|----|----|----|----|----|----|----|
| A | A |||||||||||||||| BD' ||| FR ||| A |||
| B | FR ||| A |||||||||||||||||| BD' |||
| C | A ||| BD' ||| FR ||| A ||||||||||||||||
| D | A |||||||| BD' ||| FR ||| A ||||||||||

FIGURE 2

TWO STAGE PRESSURE SWING ADSORPTION PROCESS FOR PRODUCING ENRICHED-OXYGEN

This application is the national stage of PCT application PCT/CN2005/00640, filed May 9, 2005, published as WO2005120680. This application, as filed and as published, is hereby incorporated herein by reference in its entirety.

TECHNICAL FIELD

The present invention relates to a method of producing the enriched oxygen from air by the use of a two-stage pressure-swing adsorption technique, and particularly relates to an improved method of making enriched oxygen with two-stage pressure-swing adsorption.

BACKGROUND OF THE INVENTION

Certain embodiments of the present invention can optionally improve upon the patented technique of producing enriched oxygen or enriched nitrogen from air by the use of two-stage pressure-swing adsorption (CN1386565A). Certain embodiments of the present invention can optionally increase the recovery of nitrogen and oxygen, as well as to further decrease the investment and the electricity consumption of the whole oxygen-making device at the same time.

SUMMARY OF THE INVENTION

The present invention provides an improved method of making enriched oxygen by two-stage pressure-swing adsorption. This method can overcome the technical problems of prior art mentioned above. Comparing with the prior art, this method can reduce investment and electricity consumption greatly and increase the oxygen recovery of the whole device.

The present invention can be carried out in this way:

The two-stage pressure-swing adsorption technique can be used to separate oxygen and nitrogen from air. The product can be oxygen or nitrogen or both of them. The method can use a two-stage pressure-swing adsorption device operating in series, where the first stage pressure-swing adsorption device is used to remove carbon dioxide and water as well as partially removing and enriching nitrogen. The second stage pressure-swing adsorption device is used to further remove the nitrogen in interim gas which is discharged from the adsorption tower in the adsorption step of the first stage and increase the concentration of oxygen up to the desired level. The adsorption tower of the first stage sequentially undergoes the following steps in one circulation period: adsorption A, purge P', evacuation VC, the second stage gas backward equalization repressurization 2ER, purge gas repressurization R', and final repressurization FR. The adsorption tower of the second stage sequentially undergoes the following steps in one circulation period: adsorption A, backward equalization depressurization BD', and final repressurization FR.

The adsorption tower of the second stage adds the cocurrent equalization depressurization ED step after the adsorption A step, and adds the backward repressurization ER step after the backward equalization depressurization BD' step in the meantime; the gas mixture of the repressurization ER step comes from the depressurization ED step.

The adsorption tower of the first stage adds the two-end equalization depressurization 2ED' step after the adsorption A step, and adds the two-end equalization repressurization 2ER' step after the second stage gas backward equalization repressurization 2ER step in the meantime; the gas mixture of the two-end equalization repressurization 2ER' step comes from the equalization depressurization 2ED' step.

The adsorption tower of the first stage adds backward depressurization BD step after the purge P' step.

The gas mixture discharged from the backward equalization depressurization BD' step in the adsorption tower of the second stage enters into the buffer vessel V1 until pressure balance; in the meantime, the adsorption tower of the first stage is connected with the buffer vessel V1, while proceeding the second stage gas backward equalization repressurization 2ER, until pressure balance.

The average concentration of oxygen in outlet gas, which comes from the adsorption tower in the adsorption step of the first stage, is from 21 to 80 V % or more.

The average concentration of oxygen in outlet gas, which comes from the adsorption tower in the adsorption step of the first stage, is from 21 to 25 V % or more.

The pressure of adsorption step A of two-stage pressure-swing adsorption device is from 0.001 to 0.1 Mpa (g).

The adsorbents which are packed in the adsorption tower of the first stage are activated alumina and molecular sieve from the bottom up, and the adsorbent that is packed in the adsorption tower of the second stage is molecular sieve only.

The frequency of the backward equalization depressurization ED' step in the adsorption tower of the second stage and the frequency of the second stage gas backward equalization repressurization 2ER step in the adsorption tower of the first stage are more than or equal to 1.

The frequency of the backward equalization depressurization ED' step in the adsorption tower of the second stage and the frequency of the second stage gas backward equalization repressurization 2ER step in the adsorption tower of the first stage are 3 to 7.

The present invention is used to separate oxygen and nitrogen from air. The production can be oxygen or nitrogen or both of them. The method adopts a two-stage pressure-swing adsorption device operating in series, wherein the first stage pressure-swing adsorption device is used to remove carbon dioxide and water as well as partial nitrogen and enrich nitrogen, and the second stage pressure-swing adsorption device is used to further remove the nitrogen in interim gas which is discharged from the adsorption tower in the adsorption step of the first stage and increase the concentration of oxygen up to the desired level; the adsorption tower of the first stage sequentially undergoes the following steps in one circulation period: adsorption A, two-end equalization depressurization 2ED', purge P', backward depressurization BD, the second stage gas backward equalization repressurization 2ER, two-end equalization repressurization 2ER', purge gas repressurization R', final repressurization FR; the adsorption tower of the second stage sequentially undergoes the following steps in one circulation period: adsorption A, cocurrent equalization depressurization ED, backward equalization depressurization BD', backward equalization repressurization ER, and final repressurization FR.

The pressure of adsorption step A of two-stage pressure-swing adsorption device is from 0.3 to 0.6 MPa (g).

The present invention is used to separate oxygen and nitrogen from air. The production can be oxygen or nitrogen or both of them. The method adopts two-stage pressure-swing adsorption device operating in series, wherein the first stage pressure-swing adsorption device is used to remove carbon dioxide and water as well as partial nitrogen and enrich nitrogen, and the second stage pressure-swing adsorption device is used to further remove the nitrogen in interim gas which is discharged from the adsorption tower in the adsorption step of the first stage and increase the concentration of oxygen up to the desired level; the adsorption tower of the first stage sequentially undergoes the following steps in one circulation period: adsorption A, two-end equalization depressurization 2ED', evacuation VC, the second stage gas backward equalization repressurization 2ER, two-end equalization repressurization 2ER', final repressurization FR; the adsorption tower of the second stage sequentially undergoes the following steps in one circulation period: adsorption A, backward equalization depressurization BD', and final repressurization FR.

The adsorption tower of the first stage adds the backward depressurization BD step after the two-end equalization depressurization 2ED' step.

BRIEF DESCRIPTION OF THE DRAWINGS

FIG. 1 is the working procedure scheme of technology steps for the first stage pressure-swing adsorption device of the example.

FIG. 2 is the working procedure scheme of technology steps for the second stage pressure-swing adsorption device of the example.

DETAILED DESCRIPTION OF THE INVENTION

Figure 3:
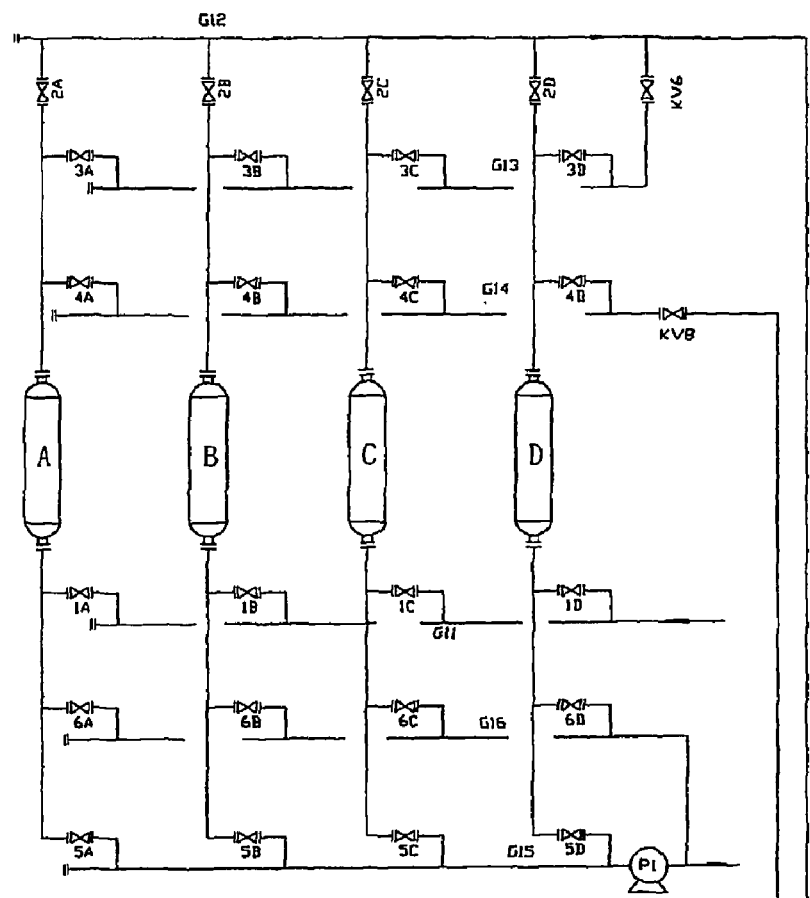
FIG. 3 is the technology flow sheet of example 1.
Figure 3:
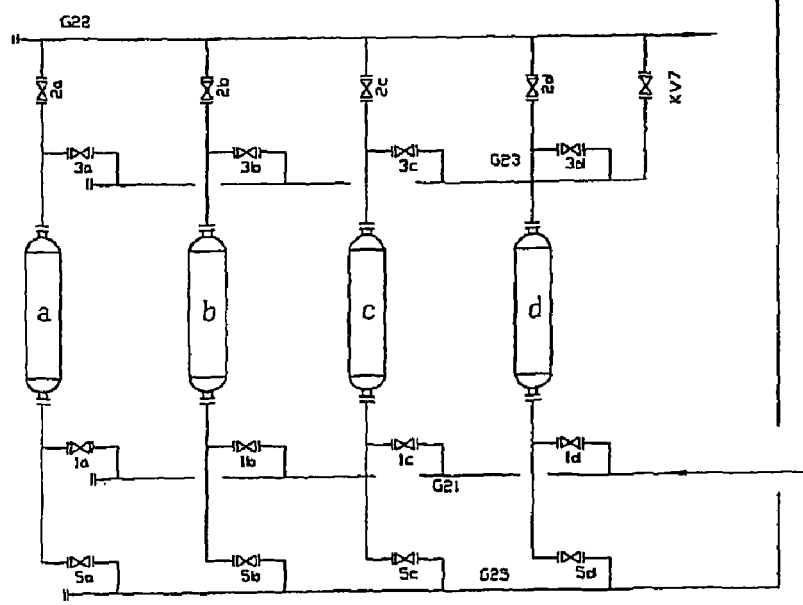

The raw material gas of the present invention is air and its typical components are shown in the following table:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

The present invention adopts the two-stage pressure-swing adsorption technique to produce the enriched oxygen from air. The method adopts a two-stage pressure-swing adsorption device operating in series, wherein the first stage is used to remove carbon dioxide and gaseous water as well as partial nitrogen. The average concentration of oxygen in outlet gas of the adsorption tower in the adsorption step is 21~80% (V). The adsorbents in the adsorption tower of the first stage are activated alumina and molecular sieve from the bottom up. The second stage is used to further remove the nitrogen in interim gas which is discharged from the adsorption tower in the adsorption step of the first stage and increase the concentration of oxygen up to the desired level. The adsorbent which is packed in the adsorption tower of the second stage is molecular sieve. The pressure of adsorption step A of two-stage pressure-swing adsorption device is 0.001~0.1 Mpa (g). Each adsorption tower of the two-stage pressure-swing adsorption device sequentially undergoes the following steps in one circulation period:

The First Stage:
(1) Adsorption A

Feed air into the inlet of the adsorption tower in adsorption step, the adsorbents in the adsorption tower adsorb selectively water, carbon dioxide and partial nitrogen, etc. in turn from the air. The nonadsorbed partial nitrogen and weakly adsorbed argon, etc. are discharged from the outlet end and enter into the adsorption tower in adsorption step of the second stage. The total amount of adsorbed water, carbon dioxide and partial nitrogen etc. increases gradually with the increase of time. Stop feeding air when the adsorbents are saturated by the components mentioned above, and the adsorption ends here.

(2) Two-End Equalization Depressurization 2ED'

After the adsorption, the concentration of oxygen in the dead-space of the adsorption tower is relatively higher and this part of oxygen should be recovered and reused. Thus, decrease the pressure of the gas in the adsorption tower from both ends of top and bottom. The gas of dead-space is discharged from the two ends of the adsorption tower and enters into the corresponding adsorption tower of the first stage that has completed the second stage gas backward equalization repressurization 2ER step to perform the two-end repressurization 2ER' step. The frequency of two-end equalization depressurization 2ED' can be 1 or above (for example, 1 to 3 times).

After the adsorption, it can also perform the step of cocurrent equalization depressurization or backward equalization depressurization only.

(3) Purge P'

After the two-end equalization depressurization 2ED' step, replace the remained oxygen in the adsorption tower out by feeding the gas got from evacuation VC step of the first stage from the bottom of the adsorption tower. The gas mixture replaced from the adsorption tower enters into the corresponding adsorption tower of the first stage that has completed the second stage gas backward equalization repressurization 2ER step or the two-end equalization repressurization 2ER' step to perform the purge gas repressurization R' step.

(4) Backward Depressurization BD

After purge P' step, this part of gas is backward vented to the atmosphere from the bottom of the adsorption tower or act as product.

(5) Evacuation VC

After purge P' step, pull out and blow off the water, carbon dioxide and nitrogen adsorbed by the adsorbents from the bottom of the adsorption tower with the vacuum pump. This step enables the absorbent to obtain the regeneration.

(6) The Second Stage Gas Backward Equalization Repressurization 2ER

After evacuation VC step, the gas discharged from the adsorption tower of the second stage that has completed the adsorption or the cocurrent equalization depressurization ED step enters into the adsorption tower of the first stage that has completed evacuation VC step, and lifts the pressure of the adsorption tower. The frequency of the second stage gas backward equalization repressurization 2ER can be 1 or above (for example, 1 to 7 times).

(7) Two-End Equalization Repressurization 2ER'

After the second stage gas backward equalization repressurization 2ER step, the gas discharged from the two-end equalization depressurization 2ED' step of the first stage enters into the adsorption tower from the inlet end and the outlet end, and lifts the pressure of the adsorption tower gradually. The frequency of 2ER' and 2ED is equal. The gas of 2ER' comes from 2ED' gas of different adsorption tower every time. The 2ER' step of the adsorption tower of the first stage is different from the general equalization repressurization ER step. In the general ER step, the gas enters at the outlet end of the adsorption tower. By contrast, in the 2ER' step of the adsorption tower of the first stage, the gas enters at the inlet end and the outlet end of the adsorption tower.

(8) Purge Gas Repressurization R'

After the 2ER' step or the 2ER step, the pressure of the adsorption tower is increased by the gas discharged from the outlet of the adsorption tower in the purge P' step of the first stage.

(9) Final Repressurization FR

After the R' step, the pressure of the adsorption tower is increased from the top with the gas discharged from the outlet of the adsorption tower in the adsorption step or with the raw material air until the adsorption pressure.

The Second Stage:

(1) Adsorption A

Feed the outlet gas of the adsorption tower in the adsorption step of the first stage into the adsorption tower in the adsorption step of the second stage. The adsorbent of the adsorption tower adsorbs selectively nitrogen. The weakly adsorbed oxygen and argon etc. are discharged from the outlet end and enter into enriched oxygen buffer vessel or the next step. The total amount of adsorbed nitrogen increases gradually with the increase of time. Stop feeding gas when the adsorbent is saturated by nitrogen and the adsorption ends here. The concentration of oxygen in the outlet gas should be controlled in the level of production required.

(2) Cocurrent Equalization Depressurization ED

After the adsorption, the dead-space gas in the adsorption tower is discharged from the outlet and enters into the corresponding adsorption tower of the second stage that has completed the backward equalization depressurization BD' step to increase the pressure. The pressure of the two towers can be equal or not, to satisfy the requirement of the concentration of the enriched oxygen in production. The frequency of ED can be 1 or above (for example, 1 to 3 times).

(3) Backward Equalization Depressurization BD'

After adsorption or ED step, perform the second stage gas backward equalization repressurization 2ER step directly for several times with the gas discharged backward from the bottom of the adsorption tower for the adsorption tower of the first stage that has completed VC step. The frequency of BD' can be 1 or above (for example, 1 to 7 times).

When performing 2ER mentioned above, we can also discharge backward the gas in the adsorption tower into a buffer vessel at first, and then transfer it into the adsorption tower that has completed VC step in first stage to perform the 2ER step. The number of the buffer vessels equals to the frequency of BD' step.

(4) Backward Repressurization ER

After backward equalization depressurization BD' step, the gas discharged from the ED step enters into the adsorption tower at the outlet end, and increases the pressure of the adsorption tower.

(5) Final Repressurization FR

The gas discharged from the outlet of the adsorption tower in the adsorption step is used to increase the pressure of the adsorption tower from the top until the adsorption pressure.

Example 1 of the Present Invention

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.01 MPa (G)

As shown in the FIG. 3, the first stage pressure-swing adsorption device is composed of four adsorption towers A~D; the adsorbents in the adsorption towers are activated alumina and molecular sieve in turn from the bottom up; single tower is simultaneously in an adsorption step and the equalizing pressure step performs once in the working procedure; do the creation of vacuum on the adsorption tower through the vacuum pipe-line G15 using the vacuum pump P1. The second stage pressure-swing adsorption device is composed of four adsorption towers a~d; the adsorbent in the adsorption towers is molecular sieve; single tower is simultaneously in an adsorption step and the equalizing pressure step performs once in the working procedure. In this example, the method can be carried out using two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level. The first stage and the second stage can also use combination of more than four adsorption towers.

The air enters into the adsorption tower in adsorption step of the first stage. The adsorbents in the adsorption tower adsorb selectively vaporous water, carbon dioxide and partial nitrogen etc. in turn from the air. The nonadsorbed partial nitrogen, weakly adsorbed oxygen and argon etc. are discharged from the outlet and enter into the adsorption tower in adsorption step of the second stage. The molecular sieve in the adsorption tower of the second stage adsorbs selectively nitrogen. The weakly adsorbed oxygen and argon etc. are discharged from the outlet and enter into buffer vessel of oxygen-enriched product. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, the second stage gas backward equalization repressurization 2ER, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, backward equalization depressurization BD', and final repressurization FR.

Taking the adsorption tower A as an example and crossing reference to FIG. 1 and FIG. 3, we demonstrate the steps of the adsorption tower of the first stage in one circulation period in this example:

Adsorption A

By now, the adsorption tower A has completed FR step. The air enters into the adsorption tower A through the pipeline G11 by opening the sequence valves 1A, 2A. In tower A, the adsorbents adsorb selectively water, carbon dioxide and partial nitrogen etc. in turn from the air. The nonadsorbed partial nitrogen and weakly adsorbed argon, etc. are discharged from the outlet and enter into the adsorption tower in adsorption step of the second stage. The total amount of adsorbed water, carbon dioxide and partial nitrogen etc. increases gradually with the increase of time. Stop feeding air when the adsorbents are saturated by the components mentioned above, and the adsorption ends here. Close the sequence valves 1A, 2A. The concentration of nitrogen in the outlet gas should be controlled at 70~78% (V).

(2) Purge P'

After the adsorption step, the outlet gas from the vacuum pump enters into the adsorption tower C through the pipeline G16 and G14 to perform the purge gas repressurization step (abbr. R') by opening the sequence valves 6A, 4A and 4C. When the concentration of nitrogen in the adsorption tower A meets the requirement, 6A, 4A and 4C are closed.

(3) Evacuation VC

After the purge P' step, the sequence valve 5A is opened, the adsorbed water, carbon dioxide and nitrogen are taken out from the bottom of the adsorption tower with a vacuum pump to vent to the atmosphere or act as a product, and the absorbents are regenerated at the same time.

The Second Stage Gas Backward Equalization Repressurization 2ER

After the evacuation VC step, open the sequence valves 5a, 4A and KV8. The gas of the BD step in the adsorption tower a of the second stage enters into the adsorption tower A to increase the pressure of the adsorption tower A.

Final Repressurization FR

After the 2ER step, open the sequence valves KV6 and 3A. The outlet gas from the adsorption tower in the adsorption step enters from the top of the adsorption tower A to increase the pressure of it. When the pressure of the adsorption tower A reaches near the adsorption pressure, KV6 and 3A are closed.

Thus, the adsorption tower A has completed a circulation period and can enter into the next circulation again. The circulation steps of the adsorption tower B~D are the same as tower A, but the operating time is staggered each other, see also FIG. 1 and FIG. 3.

Taking the adsorption tower a as an example and crossing reference to FIG. 2 and FIG. 3, we demonstrate the steps of the adsorption tower of the second stage in one circulation period in this example now:

Adsorption A

By now, the adsorption tower A has completed the FR step. The interim gas mixture enters into the adsorption tower a through the pipeline G21 by opening the sequence valves 1a, 2a. In tower a, the outlet gas from the adsorption tower in adsorption step of the first stage enters into the adsorption tower in adsorption step of the second stage. The adsorbent in the adsorption tower adsorbs selectively nitrogen. The weakly adsorbed oxygen and argon, etc. are discharged from the outlet and enter into enriched oxygen buffer vessel or the next step. The total amount of adsorbed nitrogen increases gradually with the increase of time. Stop feeding gas when the adsorbent is saturated by nitrogen, and the adsorption ends here. Close 1a, 2a.

Backward Equalization Depressurization BD'

After the adsorption step, open the sequence valves 5a, 4A and KV8. The gas in the adsorption tower A enters into the adsorption tower A backward to increase the pressure of it.

Final Repressurization FR

After the BD' step, open the sequence valves KV7 and 3a. The outlet gas from the adsorption tower in the adsorption step enters from the top of the adsorption tower A to increase the pressure of it. When the pressure of the adsorption tower A reaches near the adsorption pressure, KV7 and 3a are closed.

Thus, the adsorption tower A has completed a circulation period and can enter into the next circulation. The circulation steps of the adsorption tower b~h are the same as a, but the operating time is staggered each other, see also FIG. 2 and FIG. 3.

The result of this example is that the concentration of oxygen is above 93% (v), the concentration of nitrogen is above 99.7% (v), and the recovery of oxygen is above 98.5% (v).

Example 2 of the Present Invention

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≤45° C.
pressure: 0.01 MPa (G)

The first stage pressure-swing adsorption device is composed of seven adsorption towers A~G; the adsorbents in the adsorption towers are activated alumina and molecular sieve in turn from the bottom up; three individual towers are simultaneously in an adsorption step and the pressure equalization step performs three times in the working procedure. The second stage pressure-swing adsorption device is composed of seven adsorption towers a~g; the adsorbent in the adsorption towers is molecular sieve; five individual towers are simultaneously in an adsorption step and the pressure equalization step performs three times in the working procedure. In this example, the method can be carried out using a two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, the third second stage gas backward equalization repressurization 2ER3, the second second-stage gas backward equalization repressurization 2ER2, the first second-stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D', and final repressurization FR.

The result of this example is that the concentration of oxygen is above 93% (v), the concentration of nitrogen is above 99.7% (v), and the recovery of oxygen is above 98.5% (v).

Example 3 of the Present Invention

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.01 MPa (G)

The first stage pressure-swing adsorption device is composed of seven adsorption towers A~G; the adsorbents in the adsorption towers are activated alumina and molecular sieve in turn from the bottom up; three individual towers are simultaneously in an adsorption step and the pressure equalization step performs three times in the working procedure. The second stage pressure-swing adsorption device is composed of seven adsorption towers a~g; the adsorbent in the adsorption towers is molecular sieve; four individual towers are simultaneously in an adsorption step and the pressure equalization step performs three times in the working procedure. In this example, the method can be carried out using a two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, the third second stage gas backward equalization repressurization 2ER3, the second second-stage gas backward equalization repressurization 2ER2, the first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER and final repressurization FR.

The result of this example is that the concentration of oxygen is above 93% (v), the concentration of nitrogen is above 99.7% (v), and the recovery of oxygen is above 98.5% (v).

Example 4 of the Present Invention

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.02 MPa (G)

The adsorbents in the adsorption towers of the first stage are activated alumina and molecular sieve in turn from the bottom up. The adsorbent in the adsorption towers of the second stage is molecular sieve. In this example, the method can be carried out using a two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, the third second stage gas backward equalization repressurization 2ER3, the second second-stage gas backward equalization repressurization 2ER2, the first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D' and final repressurization FR.

The result of this example is that the concentration of oxygen is above 93% (v), the concentration of nitrogen is above 99.7% (v), and the recovery of oxygen is above 98.5% (v).

Example 5 of the Present Invention

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≤45° C.
pressure: 0.02 MPa (G)

The adsorbents in the adsorption towers of the first stage are activated alumina and molecular sieve in turn from the bottom up. The adsorbent in the adsorption towers of the second stage is molecular sieve. In this example, the method can be carried out using a two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, purge P', evacuation VC, the third second stage gas backward equalization repressurization 2ER3, the second second-stage gas backward equalization repressurization 2ER2, the first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER and final repressurization FR.

The result of this example is that the concentration of oxygen is above 93% (v), the concentration of nitrogen is above 99.7% (v), and the recovery of oxygen is above 98.5% (v).

Example 6 of the Present Invention

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≤45° C.
pressure: 0.05 MPa (G)

The adsorbents in the adsorption towers of the first stage are activated alumina and molecular sieve in turn from the bottom up. The adsorbent in the adsorption towers of the second stage is molecular sieve. In this example, the method can be carried out using a two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, two-end equalization depressurization 2ED', purge P', evacuation VC, the third second stage gas backward equalization repressurization 2ER3, the second second-stage gas backward equalization repressurization 2ER2, the first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D' and final repressurization FR.

The result of this example is that the concentration of oxygen is above 93% (v), the concentration of nitrogen is above 99.7% (v), and the recovery of oxygen is above 98.5% (v).

Example 7 of the Present Invention

The feed gas of this example is air. The concentration of oxygen in the outlet gas discharged from the adsorption tower in the adsorption step of the first stage should be controlled at 21~23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.05 MPa (G)

The adsorbents in the adsorption towers of the first stage are activated alumina and molecular sieve in turn from the bottom up. The adsorbent in the adsorption towers of the second stage is molecular sieve. In this example, the method can be carried out using a two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21~23% (V); the adsorption tower of the first stage sequentially undergoes the following steps in one circulation period: adsorption A, two-end equalization depressurization 2ED', purge P', backward depressurization BD, evacuation VC, the third second stage gas backward equalization repressurization 2ER3, the second second-stage gas backward equalization repressurization 2ER2, the first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D' and final repressurization FR.

The result of this example is that the concentration of oxygen is above 93% (v), the concentration of nitrogen is above 99.7% (v), and the recovery of oxygen is above 98.5% (v).

Example 8 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.05 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V; the adsorption tower of the first stage sequentially undergoes the following steps in one circulation period: adsorption A, two-end equalization depressurization 2ED', purge P', evacuation VC, the third second stage gas backward equalization repressurization 2ER3, the second second-stage gas backward equalization repressurization 2ER2, the first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER and final repressurization FR.

The result of this example is that the concentration of oxygen is above 93% (v), the concentration of nitrogen is above 99.7% (v), and the recovery of oxygen is above 98.5% (v).

Example 9 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.05 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, two-end equalization depressurization 2ED', purge P', backward depressurization BD, evacuation VC, the third second stage gas backward equalization repressurization 2ER3, the second second-stage gas backward equalization repressurization 2ER2, the first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER and final repressurization FR.

The result of this example is that the concentration of oxygen is above 93% (v), the concentration of nitrogen is above 99.7% (v), and the recovery of oxygen is above 98.5% (v).

Example 10 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.1 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, two-end equalization depressurization 2ED', purge P', backward depressurization BD, evacuation VC, the third second stage gas backward equalization repressurization 2ER3, the second second-stage gas backward equalization repressurization 2ER2, the first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER and final repressurization FR.

The result of this example is that the concentration of oxygen is above 93% (v), the concentration of nitrogen is above 99.9% (v), and the recovery of oxygen is above 99% (v).

Example 11 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≤45° C.
pressure: 0.3 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, first two-end equalization depressurization 2E1D', second two-end equalization depressurization 2E2D', third two-end equalization depressurization 2E3D', purge P', backward depressurization BD, evacuation VC, the third second stage gas backward equalization repressurization 2ER3, the second second-stage gas backward equalization repressurization 2ER2, the first second stage gas backward equalization repressurization 2ER1, third two-end equalization repressurization 2E3R', second two-end equalization repressurization 2E2R', first two-end equalization repressurization 2E1R', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first cocurrent equalization depressurization E1D, second cocurrent equalization depressurization E2D, third cocurrent equalization depressurization E3D, first backward equalization depressurization B1D', second backward equalization depressurization B2D', third backward equalization depressurization B3D', third backward equalization repressurization E3R, second backward equalization repressurization E2R, first backward equalization repressurization E1R and final repressurization FR.

The result of this example is that the concentration of oxygen is above 93% (v), the concentration of nitrogen is above 99.9% (v), and the recovery of oxygen is above 99% (v).

Example 12 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≤45° C.
pressure: 0.3 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, two-end equalization depressurization 2ED', purge P', backward depressurization BD, evacuation VC, the third second stage gas backward equalization repressurization 2ER3, the second second-stage gas backward equalization repressurization 2ER2, the first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first cocurrent equalization depressurization E1D, second cocurrent equalization depressurization E2D, third cocurrent equalization depressurization E3D, first backward equalization depressurization B1D', second backward equalization depressurization B2D', third backward equalization depressurization B3D', third backward equalization repressurization E3R, second backward equalization repressurization E2R, first backward equalization repressurization E1R and final repressurization FR.

The result of this example is that the concentration of oxygen is above 93% (v), the concentration of nitrogen is above 99.9% (v), and the recovery of oxygen is above 99% (v).

Example 13 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.01 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, purge P', evacuation VC, the third second stage gas backward equalization repressurization 2ER3, the second second-stage gas backward equalization repressurization 2ER2, the first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D', and final repressurization FR. The gas from the first backward equalization depressurization step B1D' of the adsorption tower of the second stage is discharged into the buffer vessel V1 to perform pressure equalization, and then the buffer vessel V1 equalizes with the adsorption tower in the first backward equalization repressurization step 2ER1 of the first stage; the gas from the second backward equalization depressurization step B2D' of the adsorption tower of the second stage is discharged into the buffer vessel V2 to perform pressure equalization, and then the buffer vessel V2 equalizes with the adsorption tower in the second backward equalization repressurization step 2ER2 of the first stage; the gas from the third backward equalization depressurization step B3D' of the adsorption tower of the second stage is discharged into the buffer vessel V3 to perform pressure equalization, and then the buffer vessel V3 equalizes with the adsorption tower in the third backward equalization repressurization step 2ER3 of the first stage.

The result of this example is that the concentration of oxygen is above 93% (v), the concentration of nitrogen is above 99.7% (v), and the recovery of oxygen is above 98.5% (v).

Example 14 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.01 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, purge P', evacuation VC, the third second stage gas backward equalization repressurization 2ER3, the second second-stage gas backward equalization repressurization 2ER2, the first second stage gas backward equalization repressurization 2ER1, purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER and final repressurization FR. The gas from the first backward equalization depressurization step B1D' of the adsorption tower of the second stage is discharged into the buffer vessel V1 to perform pressure equalization, and then the buffer vessel V1 equalizes with the adsorption tower in the first backward equalization repressurization step 2ER1 of the first stage; the gas from the second backward equalization depressurization step B2D' of the adsorption tower of the second stage is discharged into the buffer vessel V2 to perform pressure equalization, and then the buffer vessel V2 equalizes with the adsorption tower in the second backward equalization repressurization step 2ER2 of the first stage; the gas from the third backward equalization depressurization step B3D' of the adsorption tower of the second stage is discharged into the buffer vessel V3 to perform pressure equalization, and then the buffer vessel V3 equalizes with the adsorption tower in the third backward equalization repressurization step 2ER3 of the first stage.

The result of this example is that the concentration of oxygen is above 93% (v), the concentration of nitrogen is above 99.7% (v), and the recovery of oxygen is above 98.5% (v).

Example 15 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≤45° C.
pressure: 0.05 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, two-end equalization depressurization 2ED', purge P', evacuation VC, the third second stage gas backward equalization repressurization 2ER3, the second second-stage gas backward equalization repressurization 2ER2, the first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D' and final repressurization FR. The gas from the first backward equalization depressurization step B1D' of the adsorption tower of the second stage is discharged into the buffer vessel V1 to perform pressure equalization, and then the buffer vessel V1 equalizes with the adsorption tower in the first backward equalization repressurization step 2ER1 of the first stage; the gas from the second backward equalization depressurization step B2D' of the adsorption tower of the second stage is discharged into the buffer vessel V2 to perform pressure equalization, and then the buffer vessel V2 equalizes with the adsorption tower in the second backward equalization repressurization step 2ER2 of the first stage; the gas from the third backward equalization depressurization step B3D' of the adsorption tower of the second stage is discharged into the buffer vessel V3 to perform pressure equalization, and then the buffer vessel V3 equalizes with the adsorption tower in the third backward equalization repressurization step 2ER3 of the first stage.

The result of this example is that the concentration of oxygen is above 93% (v), the concentration of nitrogen is above 99.7% (v), and the recovery of oxygen is above 98.5% (v).

Example 16 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≤45° C.
pressure: 0.05 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, two-end equalization depressurization 2ED', purge P', evacuation VC, the third second stage gas backward equalization repressurization 2ER3, the second second-stage gas backward equalization repressurization 2ER2, the first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER and final repressurization FR. The gas from the first backward equalization depressurization step B1D' of the adsorption tower of the second stage is discharged into the buffer vessel V1 to perform pressure equalization, and then the buffer vessel V1 equalizes with the adsorption tower in the first backward equalization repressurization step 2ER1 of the first stage; the gas from the second backward equalization depressurization step B2D' of the adsorption tower of the second stage is discharged into the buffer vessel V2 to perform pressure equalization, and then the buffer vessel V2 equalizes with the adsorption tower in the second backward equalization repressurization step 2ER2 of the first stage; the gas from the third backward equalization depressurization step B3D' of the adsorption tower of the second stage is discharged into the buffer vessel V3 to perform pressure equalization, and then the buffer vessel V3 equalizes with the adsorption tower in the third backward equalization repressurization step 2ER3 of the first stage.

The result of this example is that the concentration of oxygen is above 93% (v), the concentration of nitrogen is above 99.7% (v), and the recovery of oxygen is above 98.5% (v).

Example 17 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 50% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≤45° C.
pressure: 0.01 MPa (G)

The first stage pressure-swing adsorption device is composed of seven adsorption towers A through G; the adsorbents in the adsorption towers are activated alumina and molecular sieve in turn from the bottom up; three individual towers are simultaneously in an adsorption step and the pressure equalization step performs three times in the working procedure. The second stage pressure-swing adsorption device is composed of seven adsorption towers a through g; the adsorbent in the adsorption towers is molecular sieve; five individual towers are simultaneously in an adsorption step and the pressure equalization step performs three times in the working procedure. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, purge P', evacuation VC, the third second stage gas backward equalization repressurization 2ER3, the second second-stage gas backward equalization repressurization 2ER2, the first second stage gas backward equalization repressurization 2ER1, purge gas repressurization R', final repressurization FR. The concentration of oxygen in the outlet gas discharged from the adsorption tower in the adsorption step of the second stage should be controlled at about 50% (V); the adsorption tower of the second stage sequentially undergoes the following steps in one circulation period: adsorption A, first backward equalization depressurization B1D', second backward equalization depressurization B2D', third backward equalization depressurization B3D', and final repressurization FR.

The result of this example is that the concentration of oxygen is above 50% (v), the concentration of nitrogen is above 99.7% (v), and the recovery of oxygen is above 98.5% (v).

Example 18 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 50% (V) (viz. oxygen-enriched product).

The components of air in this example are as following:

| component | O$_2$ | N$_2$ | Ar | CO$_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.01 MPa (G)

The first stage pressure-swing adsorption device is composed of seven adsorption towers A through G; the adsorbents in the adsorption towers are activated alumina and molecular sieve in turn from the bottom up; three individual towers are simultaneously in an adsorption step and the pressure equalization step performs three times in the working procedure. The second stage pressure-swing adsorption device is composed of seven adsorption towers a through g; the adsorbent in the adsorption towers is molecular sieve; four individual towers are simultaneously in an adsorption step and the pressure equalization step performs three times in the working procedure. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, purge P', evacuation VC, the third second stage gas backward equalization repressurization 2ER3, the second second-stage gas backward equalization repressurization 2ER2, the first second stage gas backward equalization repressurization 2ER1, purge gas repressurization R', final repressurization FR. The concentration of oxygen in the outlet gas discharged from the adsorption tower in the adsorption step of the second stage should be controlled at about 50% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER and final repressurization FR.

The result of this example is that the concentration of oxygen is above 50% (v), the concentration of nitrogen is above 99.7% (v), and the recovery of oxygen is above 98.5% (v).

Example 19 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 50% (V) (viz. oxygen-enriched product).

The components of air in this example are as following:

| component | O$_2$ | N$_2$ | Ar | CO$_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.05 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, two-end equalization depressurization 2ED', purge P', evacuation VC, the third second stage gas backward equalization repressurization 2ER3, the second second-stage gas backward equalization repressurization 2ER2, the first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 50% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER and final repressurization FR.

The result of this example is that the concentration of oxygen is above 50% (v), the concentration of nitrogen is above 99.7% (v), and the recovery of oxygen is above 98.5% (v).

Example 20 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.6 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, two-end equalization depressurization 2ED', purge P', backward depressurization BD, evacuation VC, the third second stage gas backward equalization repressurization 2ER3, the second second-stage gas backward equalization repressurization 2ER2, the first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first cocurrent equalization depressurization E1D, second cocurrent equalization depressurization E2D, third cocurrent equalization depressurization E3D, first backward equalization depressurization B1D', second backward equalization depressurization B2D', third backward equalization depressurization B3D', third backward equalization repressurization E3R, second backward equalization repressurization E2R, first backward equalization repressurization E1R and final repressurization FR.

The result of this example is that the concentration of oxygen is above 93% (v), the concentration of nitrogen is above 99.9% (v), and the recovery of oxygen is above 99% (v).

Example 21 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.6 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, two-end equalization depressurization 2ED', purge P', backward depressurization BD, evacuation VC, the third second stage gas backward equalization repressurization 2ER3, the second second-stage gas backward equalization repressurization 2ER2, the first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V), the adsorption tower of the second stage sequentially undergoes the following steps in one circulation period: adsorption A, first cocurrent equalization depressurization E1D, second cocurrent equalization depressurization E2D, third cocurrent equalization depressurization E3D, first backward equalization depressurization B1D', second backward equalization depressurization B2D', third backward equalization depressurization B3D', third backward equalization repressurization E3R, second backward equalization repressurization E2R, first backward equalization repressurization E1R and final repressurization FR. The gas from the first backward equalization depressurization step B1D' of the adsorption tower of the second stage is discharged into the buffer vessel V1 to perform pressure equalization, and then the buffer vessel V1 equalizes with the adsorption tower in the first backward equalization repressurization step 2ER1 of the first stage; the gas from the second backward equalization depressurization step B2D' of the adsorption tower of the second stage is discharged into the buffer vessel V2 to perform pressure equalization, and then the buffer vessel V2 equalizes with the adsorption tower in the second backward equalization repressurization step 2ER2 of the first stage; the gas from the third backward equalization depressurization step B3D' of the adsorption tower of the second stage is discharged into the buffer vessel V3 to perform pressure equalization, and then the buffer vessel V3 equalizes with the adsorption tower in the third backward equalization repressurization step 2ER3 of the first stage.

The result of this example is that the concentration of oxygen is above 93% (v), the concentration of nitrogen is above 99.9% (v), and the recovery of oxygen is above 99.6% (v).

Example 22 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≤45° C.
pressure: 0.6 MPa (G)

The adsorbents in the adsorption towers of the first stage are activated alumina and molecular sieve in turn from the bottom up. The adsorbent in the adsorption towers of the second stage is molecular sieve. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, two-end equalization depressurization 2ED', purge P', backward depressurization BD, the third second stage gas backward equalization repressurization 2ER3, the second second-stage gas backward equalization repressurization 2ER2, the first second stage gas backward equalization repressurization 2ER1, two-end equalization repressurization 2ER', purge gas repressurization R', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first cocurrent equalization depressurization E1D, second cocurrent equalization depressurization E2D, third cocurrent equalization depressurization E3D, first backward equalization depressurization B1D', second backward equalization depressurization B2D', third backward equalization depressurization B3D', third backward equalization repressurization E3R, second backward equalization repressurization E2R, first backward equalization repressurization E1R and final repressurization FR. The gas from the first backward equalization depressurization step B1D' of the adsorption tower of the second stage is discharged into the buffer vessel V1 to perform pressure equalization, and then the buffer vessel V1 equalizes with the adsorption tower in the first backward equalization repressurization step 2ER1 of the first stage; the gas from the second backward equalization depressurization step B2D' of the adsorption tower of the second stage is discharged into the buffer vessel V2 to perform pressure equalization, and then the buffer vessel V2 equalizes with the adsorption tower in the second backward equalization repressurization step 2ER2 of the first stage; the gas from the third backward equalization depressurization step B3D' of the adsorption tower of the second stage is discharged into the buffer vessel V3 to perform pressure equalization, and then the buffer vessel V3 equalizes with the adsorption tower in the third backward equalization repressurization step 2ER3 of the first stage.

The result of this example is that the concentration of oxygen is above 93% (v), the concentration of nitrogen is above 99.9% (v), and the recovery of oxygen is above 99.6% (v).

Example 23 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≤45° C.
pressure: 0.01 MPa (G)

The first stage pressure-swing adsorption device is composed of seven adsorption towers A through G; the adsorbents in the adsorption towers are activated alumina and molecular sieve in turn from the bottom up; three individual towers are simultaneously in an adsorption step and the pressure equalization step performs three times in the working procedure. The second stage pressure-swing adsorption device is composed of seven adsorption towers A through g; the adsorbent in the adsorption towers is molecular sieve; five individual towers are simultaneously in an adsorption step and the pressure equalization step performs three times in the working procedure. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, two-end equalization depressurization 2ED', evacuation VC, the third second stage gas backward equalization repressurization 2ER3, the second second-stage gas backward equalization repressurization 2ER2, the first second stage gas backward equalization repressurization 2ER1, two-end equalization repressurization 2ER', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D', and final repressurization FR.

The result of this example is that the concentration of oxygen is above 93% (v), the concentration of nitrogen is above 99.7% (v), and the recovery of oxygen is above 98.5% (v).

Example 24 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.1 MPa (G)

The first stage pressure-swing adsorption device is composed of seven adsorption towers A through G; the adsorbents in the adsorption towers are activated alumina and molecular sieve in turn from the bottom up; three individual towers are simultaneously in an adsorption step and the pressure equalization step performs three times in the working procedure. The second stage pressure-swing adsorption device is composed of seven adsorption towers A through g; the adsorbent in the adsorption towers is molecular sieve; five individual towers are simultaneously in an adsorption step and the pressure equalization step performs three times in the working procedure. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, two-end equalization depressurization 2ED', backward depressurization BD, evacuation VC, the third second stage gas backward equalization repressurization 2ER3, the second second-stage gas backward equalization repressurization 2ER2, the first second stage gas backward equalization repressurization 2ER1, two-end equalization repressurization 2ER', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, first backward equalization depressurization B1D', second backward equalization depressurization B2D', third backward equalization depressurization B3D', and final repressurization FR.

The result of this example is that the concentration of oxygen is above 93% (v), the concentration of nitrogen is above 99.7% (v), and the recovery of oxygen is above 98.5% (v).

Example 25 of the Present Invention

The feed gas of this example is air. The concentration of oxygen in the outlet gas discharged from the adsorption tower in the adsorption step of the first stage should be controlled at 21 to 23% (V). The concentration of oxygen in the outlet gas discharged from the adsorption tower in the adsorption step of the second stage should be controlled at about 93% (V) (viz. oxygen-enriched product).

The components of air in this example are as following:

| component | $O_2$ | $N_2$ | Ar | $CO_2$ | others | Σ |
|---|---|---|---|---|---|---|
| Conc. (%) (V) | 20.93 | 78.03 | 0.932 | 0.03 | 0.078 | 100 |

Temp.: ≦45° C.
pressure: 0.01 MPa (G)

The first stage pressure-swing adsorption device is composed of seven adsorption towers A through G; the adsorbents in the adsorption towers are activated alumina and molecular sieve in turn from the bottom up; three individual towers are simultaneously in an adsorption step and the pressure equalization step performs three times in the working procedure. The second stage pressure-swing adsorption device is composed of seven adsorption towers a through g; the adsorbent in the adsorption towers is molecular sieve; five individual towers are simultaneously in an adsorption step and the pressure equalization step performs three times in the working procedure. In this example, the method adopts two-stage pressure-swing adsorption device operating in series, wherein the first stage is used to remove the gaseous water, carbon dioxide and partial nitrogen in the air, and the second stage is used to further remove the nitrogen in interim gas which is discharged from the adsorption tower in the adsorption step of the first stage and increase the concentration of oxygen up to the desired level.

The air enters into the adsorption tower in adsorption step of the first stage. The adsorbents in the adsorption tower adsorb gaseous water, carbon dioxide and partial nitrogen, etc. selectively in turn from the air. The nonadsorbed partial nitrogen, weakly adsorbed oxygen and argon, etc. are discharged from the outlet and enter into the adsorption tower in adsorption step of the second stage. The molecular sieve in the adsorption tower of the second stage adsorbs nitrogen selectively. The weakly adsorbed oxygen and argon, etc. are discharged from the outlet and enter into buffer vessel of oxygen-enriched product. The concentration of oxygen in the outlet gas discharged from the adsorption tower in the adsorption step of the first stage should be controlled at 21 to 23% (V); the adsorption tower of the first stage sequentially undergoes the following steps in one circulation period: adsorption A, two-end equalization depressurization 2ED', evacuation VC, the third second stage gas backward equalization repressurization 2ER3, the second second-stage gas backward equalization repressurization 2ER2, the first second stage gas backward equalization repressurization 2ER1, two-end equalization repressurization 2ER', final repressurization FR. The concentration of oxygen in the outlet gas discharged from the adsorption tower in the adsorption step of the second stage should be controlled at about 93% (V); the adsorption tower of the second stage sequentially undergoes the following steps in one circulation period: adsorption A, cocurrent equalization depressurization ED, first backward equalization depressurization B1D', second backward equalization depressurization B2D', third backward equalization depressurization B3D', backward equalization repressurization ER and final repressurization FR.

The result of this example is that the concentration of oxygen is above 93% (v), the concentration of nitrogen is above 99.7% (v), and the recovery of oxygen is above 98.5% (v).

INDUSTRIAL APPLICATION

The present invention can be applied to a wide range of industrial fields: chemical engineering, petrochemical processing, metallurgy, building materials, environmental protection, pharmacy, and so on.

I claim:

1. An improved method of making enriched oxygen with two-stage pressure-swing adsorption, wherein oxygen and nitrogen are separated from air; the production can be oxygen or nitrogen or both of them; the method adopts two-stage pressure-swing adsorption device operating in series, wherein the first stage pressure-swing adsorption device is used to remove carbon dioxide and water as well as partial nitrogen and enrich nitrogen, and the second stage pressure-swing adsorption device is used to further remove the nitrogen in interim gas which is discharged from the adsorption tower in the adsorption step of the first stage and increase the concentration of oxygen up to the desired level; the adsorption tower of the first stage sequentially undergoes the following steps in one circulation period: adsorption A, purge P', evacuation VC, the second stage gas backward equalization repressurization 2ER, purge gas repressurization R', final repressurization FR; the adsorption tower of the second stage sequentially undergoes the following steps in one circulation period: adsorption A, backward equalization depressurization BD', and final repressurization FR.

2. The method of claim 1, wherein the adsorption tower of the second stage adds the cocurrent equalization depressurization ED step after the adsorption A step, and adds the backward repressurization ER step after the backward equalization depressurization BD' step in the meantime; the gas mixture of the repressurization ER step comes from the depressurization ED step.

3. The method of claim 1, wherein the adsorption tower of the first stage adds the two-end equalization depressurization 2ED' step after the adsorption A step, and adds the two-end equalization repressurization 2ER' step after the second stage gas backward equalization repressurization 2ER step in the meantime; the gas mixture of the two-end equalization repressurization 2ER' step comes from the equalization depressurization 2ED' step.

4. The method of claim 3, wherein the adsorption tower of the first stage adds backward depressurization BD step after the purge P' step.

5. The method of claim 1, wherein the gas mixture discharged from the backward equalization depressurization BD' step in the adsorption tower of the second stage enters into a buffer vessel V until pressure balance; in the meantime, the adsorption tower of the first stage is connected with the buffer vessel V, while proceeding the second stage gas backward equalization repressurization 2ER, until pressure balance.

6. The method of claim 3, wherein the gas mixture discharged from the backward equalization depressurization BD' step in the adsorption tower of the second stage enters into a buffer vessel V until pressure balance; in the meantime, the adsorption tower of the first stage is connected with the buffer vessel V, while proceeding the second stage gas backward equalization repressurization 2ER, until pressure balance.

7. The method of claim 4, wherein the gas mixture discharged from the backward equalization depressurization BD' step in the adsorption tower of the second stage enters into a buffer vessel V until pressure balance; in the meantime, the adsorption tower of the first stage is connected with the buffer vessel V, while proceeding the second stage gas backward equalization repressurization 2ER step, until pressure balance.

8. The method of claim 1, wherein the average concentration of oxygen in outlet gas, which comes from the adsorption tower in the adsorption step of the first stage, is 21 to 80 V %.

9. The method of claim 3, wherein the average concentration of oxygen in outlet gas, which comes from the adsorption tower in the adsorption step of the first stage, is 21 to 80 V %.

10. The method of claim 5, wherein the average concentration of oxygen in outlet gas, which comes from the adsorption tower in the adsorption step of the first stage, is 21 to 80 V %.

11. The method of claim 9, wherein the average concentration of oxygen in outlet gas, which comes from the adsorption tower in the adsorption step of the first stage, is 21 to 25V %.

12. The method of claim 10, wherein the average concentration of oxygen in outlet gas, which comes from the adsorption tower in the adsorption step of the first stage, is 21 to 25V %.

13. The method of claim 1, wherein the pressure of adsorption step A of two-stage pressure-swing adsorption device is 0.001 to 0.1 Mpa(g).

14. The method of claim 3, wherein the pressure of adsorption step A of two-stage pressure-swing adsorption device is 0.001 to 0.6 Mpa(g).

15. The method of claim 4, wherein the pressure of adsorption step A of two-stage pressure-swing adsorption device is 0.001 to 0.6 Mpa(g).

16. The method of claim 1, wherein the adsorbents which are packed in the adsorption tower of the first stage are activated alumina and molecular sieve from the bottom up, and the adsorbent which is packed in the adsorption tower of the second stage is molecular sieve only.

17. The method of claim 1, wherein the frequency of the backward equalization depressurization BD' step in the adsorption tower of the second stage and the frequency of the second stage gas backward equalization repressurization 2ER step in the adsorption tower of the first stage are more than or equal to 1.

18. The method of claim 3, wherein the frequency of the backward equalization depressurization BD' step in the adsorption tower of the second stage and the frequency of the second stage gas backward equalization repressurization 2ER step in the adsorption tower of the first stage are more than or equal to 1.

19. The method of claim 4, wherein the frequency of the backward equalization depressurization BD' step in the adsorption tower of the second stage and the frequency of the second stage gas backward equalization repressurization 2ER step in the adsorption tower of the first stage are more than or equal to 1.

20. The method of claim 17, wherein the frequency of the backward equalization depressurization BD' step in the adsorption tower of the second stage and the frequency of the second stage gas backward equalization repressurization 2ER step in the adsorption tower of the first stage are 3 to 7.

21. The method of claim 18, wherein the frequency of the backward equalization depressurization BD' step in the adsorption tower of the second stage and the frequency of the second stage gas backward equalization repressurization 2ER step in the adsorption tower of the first stage are 3 to 7.

22. The method of claim 19, wherein the frequency of the backward equalization depressurization BD' step in the adsorption tower of the second stage and the frequency of the second stage gas backward equalization repressurization 2ER step in the adsorption tower of the first stage are 3 to 7.

23. An improved method of making enriched oxygen with two-stage pressure-swing adsorption, wherein oxygen and nitrogen are separated from air; the production can be oxygen or nitrogen or both of them; the method adopts two-stage pressure-swing adsorption device operating in series, wherein the first stage pressure-swing adsorption device is used to remove carbon dioxide and water as well as partial nitrogen and enrich nitrogen, and the second stage pressure-swing adsorption device is used to further remove the nitrogen in interim gas which is discharged from the adsorption tower in the adsorption step of the first stage and increase the concentration of oxygen up to the desired level; the adsorption tower of the first stage sequentially undergoes the following steps in one circulation period: adsorption A, two-end equalization depressurization 2ED', purge P', backward depressurization BD, the second stage gas backward equalization repressurization 2ER, two-end equalization repressurization 2ER', purge gas repressurization R', final repressurization FR; the adsorption tower of the second stage sequentially undergoes the following steps in one circulation period: adsorption A, cocurrent equalization depressurization ED, backward equalization depressurization BD', backward equalization repressurization ER, and final repressurization FR.

24. The method of claim 23, wherein the pressure of adsorption A step of two-stage pressure-swing adsorption device is 0.3 to 0.6 Mpa(g).

25. An improved method of making enriched oxygen with two-stage pressure-swing adsorption, wherein oxygen and nitrogen are separated from air; the production can be oxygen or nitrogen or both of them; the method adopts two-stage pressure-swing adsorption device operating in series, wherein the first stage pressure-swing adsorption device is used to remove carbon dioxide and water as well as partial nitrogen and enrich nitrogen, and the second stage pressure-swing adsorption device is used to further remove the nitrogen in interim gas which is discharged from the adsorption tower in the adsorption step of the first stage and increase the concentration of oxygen up to the desired level; the adsorption tower of the first stage sequentially undergoes the following steps in one circulation period: adsorption A, two-end equalization depressurization 2ED', evacuation VC, the second stage gas backward equalization repressurization 2ER, two-end equalization repressurization 2ER', final repressurization FR; the adsorption tower of the second stage sequentially undergoes the following steps in one circulation period: adsorption A, backward equalization depressurization BD', and final repressurization FR.

26. The method of claim 25, wherein the adsorption tower of the second stage adds the cocurrent equalization depressurization ED step after the adsorption A step, and adds the backward repressurization ER step after the backward equalization depressurization BD' step in the meantime; the gas mixture of the repressurization ER step comes from the depressurization ED step.

27. The method of claim 25, wherein the adsorption tower of the first stage adds the backward depressurization BD step after the two-end equalization depressurization 2ED' step.

28. The method of claim 25, wherein the gas mixture discharged from the backward equalization depressurization BD' step in the adsorption tower of the second stage enters into a buffer vessel V1 until pressure balance; in the meantime, the adsorption tower of the first stage is connected with the buffer vessel V1, while proceeding the second stage gas backward equalization repressurization 2ER, until pressure balance.

29. The method of claim 25, wherein the pressure of adsorption A step of two-stage pressure-swing adsorption device is 0.005 to 0.6 Mpa(g).

30. The method of claim 2, wherein the adsorption tower of the first stage adds the two-end equalization depressurization 2ED' step after the adsorption A step, and adds the two-end equalization repressurization 2ER' step after the second stage gas backward equalization repressurization 2ER step in the meantime; the gas mixture of the two-end equalization repressurization 2ER' step comes from the equalization depressurization 2ED' step.

31. The method of claim 30, wherein the adsorption tower of the first stage adds backward depressurization BD step after the purge P' step.

32. The method of claim 2, wherein the gas mixture discharged from the backward equalization depressurization BD' step in the adsorption tower of the second stage enters into a buffer vessel V until pressure balance; in the meantime, the adsorption tower of the first stage is connected with the buffer vessel V, while proceeding the second stage gas backward equalization repressurization 2ER, until pressure balance.

33. The method of claim 30, wherein the gas mixture discharged from the backward equalization depressurization BD' step in the adsorption tower of the second stage enters into a buffer vessel V until pressure balance; in the meantime, the adsorption tower of the first stage is connected with the buffer vessel V, while proceeding the second stage gas backward equalization repressurization 2ER, until pressure balance.

34. The method of claim 31, wherein the gas mixture discharged from the backward equalization depressurization BD' step in the adsorption tower of the second stage enters into a buffer vessel V until pressure balance; in the meantime, the adsorption tower of the first stage is connected with the buffer vessel V, while proceeding the second stage gas backward equalization repressurization 2ER step, until pressure balance.

35. The method of claim 2, wherein the average concentration of oxygen in outlet gas, which comes from the adsorption tower in the adsorption step of the first stage, is 21 to 80 V %.

36. The method of claim 30, wherein the average concentration of oxygen in outlet gas, which comes from the adsorption tower in the adsorption step of the first stage, is 21 to 80 V %.

37. The method of claim 32, wherein the average concentration of oxygen in outlet gas, which comes from the adsorption tower in the adsorption step of the first stage, is 21 to 80 V %.

38. The method of claim 36, wherein the average concentration of oxygen in outlet gas, which comes from the adsorption tower in the adsorption step of the first stage, is 21 to 25V %.

39. The method of claim 37, wherein the average concentration of oxygen in outlet gas, which comes from the adsorption tower in the adsorption step of the first stage, is 21 to 25V %.

40. The method of claim 2, wherein the pressure of adsorption step A of two-stage pressure-swing adsorption device is 0.001 to 0.1 Mpa(g).

41. The method of claim 30, wherein the pressure of adsorption step A of two-stage pressure-swing adsorption device is 0.001 to 0.6 Mpa(g).

42. The method of claim 31, wherein the pressure of adsorption step A of two-stage pressure-swing adsorption device is 0.001 to 0.6 Mpa(g).

43. The method of claim 2, wherein the adsorbents which are packed in the adsorption tower of the first stage are activated alumina and molecular sieve from the bottom up, and the adsorbent which is packed in the adsorption tower of the second stage is molecular sieve only.

44. The method of claim 2, wherein the frequency of the backward equalization depressurization BD' step in the adsorption tower of the second stage and the frequency of the second stage gas backward equalization repressurization 2ER step in the adsorption tower of the first stage are more than or equal to 1.

45. The method of claim 30, wherein the frequency of the backward equalization depressurization BD' step in the adsorption tower of the second stage and the frequency of the second stage gas backward equalization repressurization 2ER step in the adsorption tower of the first stage are more than or equal to 1.

46. The method of claim 31, wherein the frequency of the backward equalization depressurization BD' step in the adsorption tower of the second stage and the frequency of the second stage gas backward equalization repressurization 2ER step in the adsorption tower of the first stage are more than or equal to 1.

47. The method of claim 44, wherein the frequency of the backward equalization depressurization BD' step in the adsorption tower of the second stage and the frequency of the second stage gas backward equalization repressurization 2ER step in the adsorption tower of the first stage are 3 to 7.

48. The method of claim 45, wherein the frequency of the backward equalization depressurization BD' step in the adsorption tower of the second stage and the frequency of the second stage gas backward equalization repressurization 2ER step in the adsorption tower of the first stage are 3 to 7.

49. The method of claim 46, wherein the frequency of the backward equalization depressurization BD' step in the adsorption tower of the second stage and the frequency of the second stage gas backward equalization repressurization 2ER step in the adsorption tower of the first stage are 3 to 7.

50. The method of claim 26, wherein the adsorption tower of the first stage adds the backward depressurization BD step after the two-end equalization depressurization 2ED' step.

51. The method of claim 26, wherein the gas mixture discharged from the backward equalization depressurization BD' step in the adsorption tower of the second stage enters into a buffer vessel V1 until pressure balance; in the meantime, the adsorption tower of the first stage is connected with the buffer vessel V1, while proceeding the second stage gas backward equalization repressurization 2ER, until pressure balance.

52. The method of claim 26, wherein the pressure of adsorption A step of two-stage pressure-swing adsorption device is 0.005 to 0.6 Mpa(g).

* * * * *